United States Patent
Wang et al.

(10) Patent No.: US 10,574,406 B2
(45) Date of Patent: Feb. 25, 2020

(54) WIRELESS COMMUNICATION METHOD, USER EQUIPMENT AND ENODE B

(71) Applicant: Panasonic Intellectual Property Corporation of America, Torrance, CA (US)

(72) Inventors: Lilei Wang, Beijing (CN); Hidetoshi Suzuki, Kanagawa (JP); Chi Gao, Beijing (CN); Li Wang, Beijing (CN); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/604,222

(22) Filed: May 24, 2017

(65) Prior Publication Data
US 2017/0257190 A1    Sep. 7, 2017

Related U.S. Application Data

(63) Continuation of application No. PCT/CN2015/075520, filed on Mar. 31, 2015.

(51) Int. Cl.
*H04L 1/18*    (2006.01)

(52) U.S. Cl.
CPC ............ *H04L 1/189* (2013.01); *H04L 1/1816* (2013.01); *H04L 1/1896* (2013.01)

(58) Field of Classification Search
CPC ............................... H04W 4/00; H04L 1/1812
USPC .................................................. 370/221–349
See application file for complete search history.

(56) References Cited

U.S. PATENT DOCUMENTS

| | | |
|---|---|---|
| 2010/0111068 A1 | 5/2010 | Wu |
| 2010/0265906 A1 | 10/2010 | Bucknell et al. |
| 2014/0056237 A1 | 2/2014 | Eriksson et al. |
| 2014/0098761 A1 | 4/2014 | Lee et al. |
| 2014/0226638 A1 | 8/2014 | Xu et al. |
| 2014/0301305 A1 | 10/2014 | Xu et al. |
| 2014/0321418 A1 | 10/2014 | Rinne et al. |

(Continued)

FOREIGN PATENT DOCUMENTS

| | | |
|---|---|---|
| CN | 101741529 A | 6/2010 |
| EP | 2 184 882 A | 5/2010 |

(Continued)

OTHER PUBLICATIONS

International Search Report of PCT application No. PCT/CN2015/075520 dated Jan. 11, 2016.

(Continued)

*Primary Examiner* — Iqbal Zaidi
(74) *Attorney, Agent, or Firm* — Seed IP Law Group LLP

(57) ABSTRACT

Provided are wireless communication methods, a UE and an eNB. The wireless communication method performed by a UE includes transmitting transport block repetitions to an eNB, wherein one HARQ process includes multiple repetition sets of a transport block if one repetition set of the transport block is not enough for the eNB to successfully decode the transport block, each of the multiple repetition sets includes multiple repetitions of the transport block, each of the multiple repetition sets is followed by a feedback channel to indicate whether the transport block is successfully decoded by the eNB.

15 Claims, 7 Drawing Sheets

(56) References Cited

U.S. PATENT DOCUMENTS

2015/0043420 A1    2/2015  Xiong et al.
2016/0262118 A1*   9/2016  Kim .................... H04W 52/365
2017/0070312 A1*   3/2017  Yi ........................ H04J 11/0069

FOREIGN PATENT DOCUMENTS

EP      2 836 044 A     2/2015
JP      2011-509586 A   3/2011
WO      2009/131509 A1  10/2009
WO      2013/138779 A1  9/2013
WO      2014/055878 A1  4/2014

OTHER PUBLICATIONS

Extended European Search Report, dated Feb. 21, 2018, for the related European Patent Appiication No. 15886885.1-1219 / 3278483, 8 pages.
English Translation of Chinese Search Report dated Sep. 2, 2019 for the related Chinese Patent Application No. 201580054632.9.

\* cited by examiner

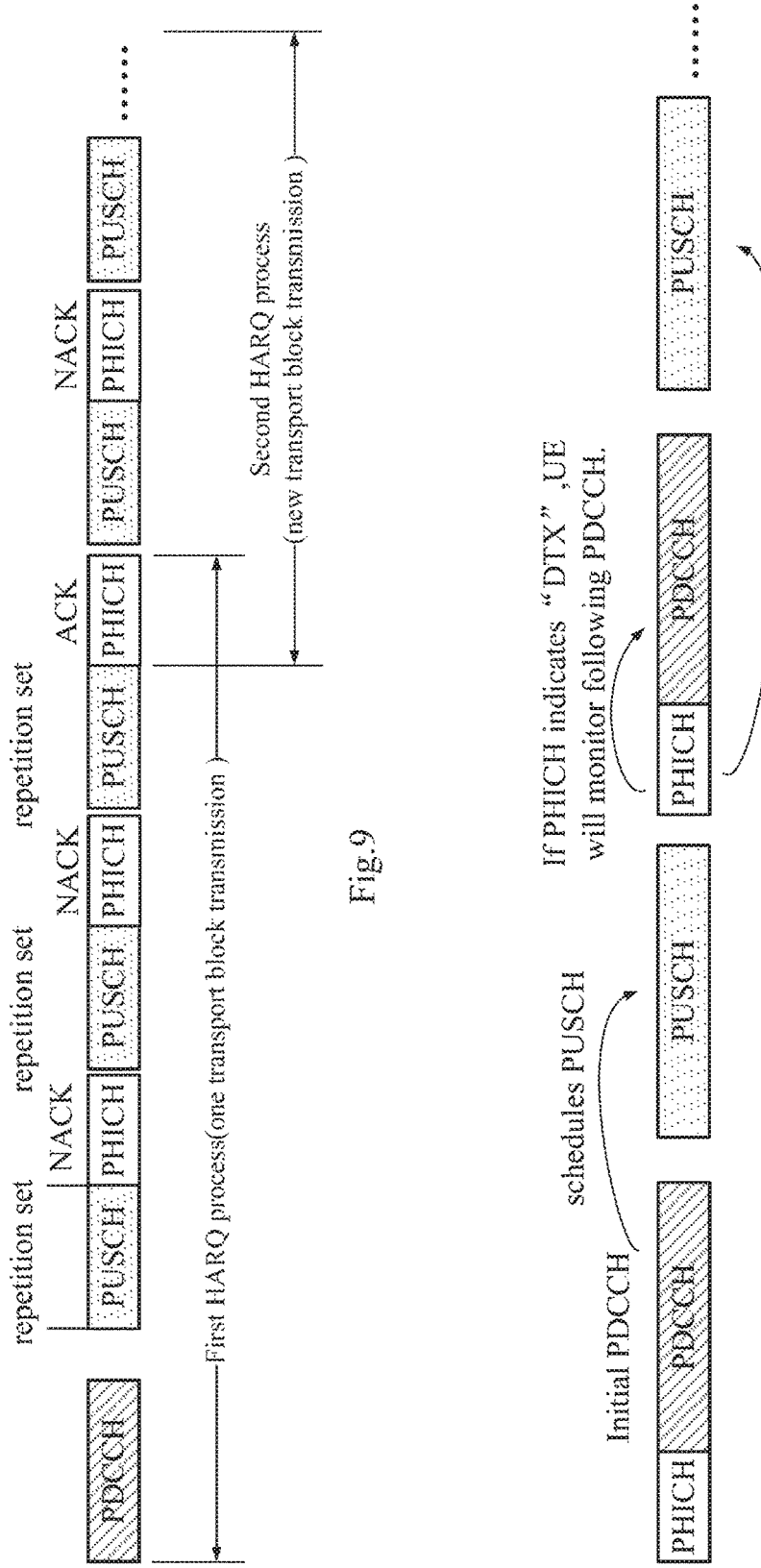

form a part thereof. In
WIRELESS COMMUNICATION METHOD, USER EQUIPMENT AND ENODE B

BACKGROUND

1. Technical Field

The present disclosure relates to the field of wireless communication, and in particular, to wireless communication methods, a user equipment (UE) and an eNode B (eNB).

2. Description of the Related Art

Machine-Type Communication (MTC) is an important revenue stream for operators and has a huge potential from the operator perspective. For MTC in coverage enhancement, basically each channel needs to do multiple repetitions to reach for example 15 dB coverage enhancement requirement. However, since the eNB has no Channel State Information (CSI) feedback or just obtains coarse CSI from the UE, it is difficult to guide UE's transmissions with accurate repetition times.

SUMMARY

One non-limiting and exemplary embodiment provides an approach to optimize the repetition times for uplink transmission.

In one general aspect, the techniques disclosed here feature a wireless communication method performed by a user equipment (UE), including: transmitting transport block repetitions to an eNodeB (eNB), wherein one hybrid automatic repeat request (HARQ) process includes multiple repetition sets of a transport block if one repetition set of the transport block is not enough for the eNB to successfully decode the transport block, each of the multiple repetition sets includes multiple repetitions of the transport block, each of the multiple repetition sets is followed by a feedback channel to indicate whether the transport block is successfully decoded by the eNB, and if the feedback channel indicates that the transport block is not successfully decoded by the eNB, the UE continues to transmit another repetition set of the transport block.

According to the present disclosure, the repetition times for an uplink transport block can be adapted according to the transmission condition, which saves the UE's power in addition to the time-frequency resources since the UE does not necessarily always transmit a large number of repetitions to guarantee successful decoding. In addition, the UE's repetition times in uplink during random access can also be optimized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 schematically illustrates another example of two adjacent exemplary HARQ processes according to an embodiment of the present disclosure;

FIG. 10 is a schematic diagram for illustrating three states of the feedback channel according to an embodiment of the present disclosure;

DETAILED DESCRIPTION

Figure 1:
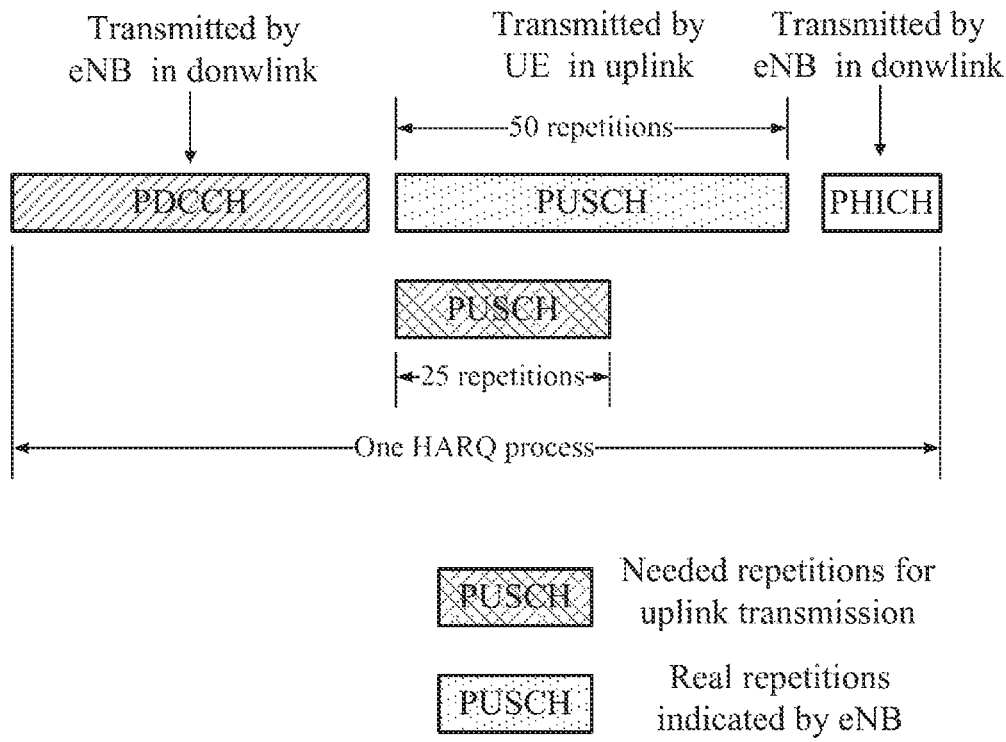
FIG. 1 exemplarily illustrates a HARQ process for MTC in coverage.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

For MTC in coverage enhancement, since the eNB has no CSI feedback or just obtains coarse CSI from the UE, it is difficult to guide UE's transmissions with accurate repetition times. The eNB may indicate relatively large or conservative repetition times (repetition number) for uplink transmission to reach for example 99% success ratio. Such a behavior costs the UE more power. FIG. 1 exemplarily illustrates a HARQ process for MTC in coverage. As shown in FIG. 1, the eNB indicates 50 repetitions (i.e., the indicated repetition number is 50) for physical uplink shared channel (PUSCH) by the physical downlink control channel (PDCCH), the UE transmits 50 repetitions in the uplink, and the eNB feeds back to the UE whether the PUSCH is successfully decoded by Physical Hybrid-ARQ Indicator Channel (PHICH). However, the needed repetition number may be only 25 (that is, the eNB can successfully decode the PUSCH with 25 repetitions) though the eNB indicates 50 repetitions due to inaccurate CSI knowledge. In this case, 25 repetitions are wasted. Repetitions more than needed in uplink wastes a lot of UE's power in addition to time-frequency resources. Therefore, optimizing repetition times as much as possible especially for uplink transmission is quite important. The present disclosure provides an approach to optimize the repetition times for uplink transmission in order to save UE's power and time-frequency resources.

In the present disclosure, MTC may be taken as an example to describe the principle of the present disclosure; however, it is noted that the wireless communication methods disclosed in the present disclosure can not only be applied to MTC, but also be applied to other wireless communications such as other communications conforming to LTE specifications as long as those wireless communications transmit transport block(s) in the uplink repeatedly. Accordingly, the UEs are not limited to MTC UEs, but can be any other UEs that can perform the communication methods described in the present disclosure.

First Embodiment

Figure 2:
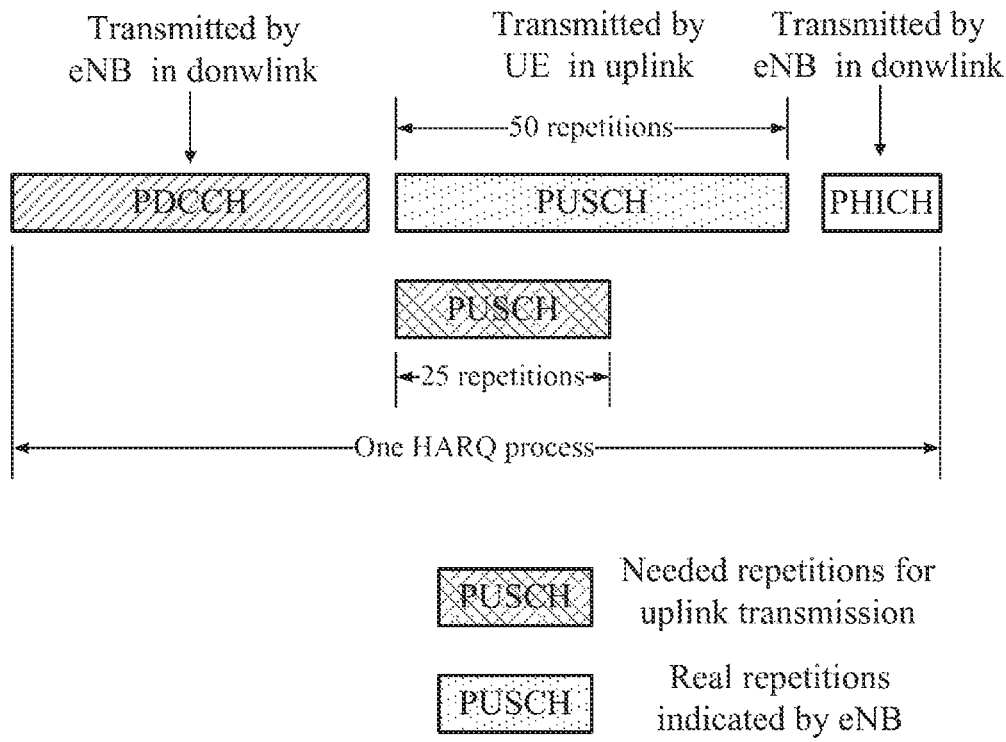
FIG. 2 schematically illustrates a flowchart of a wireless communication method at UE side according to an embodiment of the present disclosure.
Figure 3:
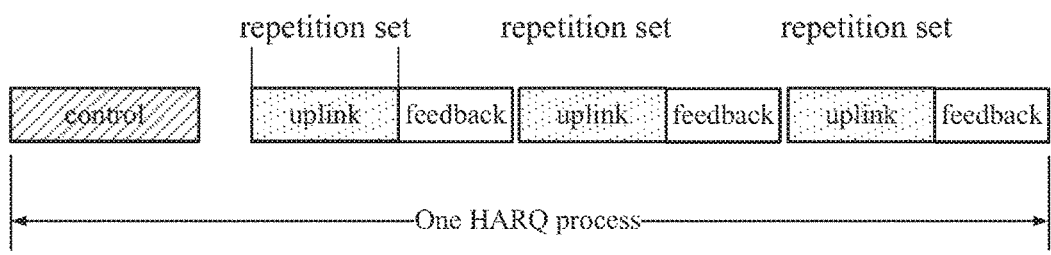
FIG. 3 schematically illustrates an exemplary HARQ process according to an embodiment of the present disclosure.

The first embodiment of the present disclosure provides a wireless communication method 200 performed by a UE, as shown in FIG. 2 which schematically illustrates the flowchart of the wireless communication method 200 according to the first embodiment of the present disclosure. The wireless communication method 200 includes a step 201 of transmitting transport block repetitions to an eNB. According to this embodiment, one HARQ process can include multiple repetition sets of a transport block if one repetition set of the transport block is not enough for the eNB to successfully decode the transport block, each of the multiple repetition sets includes multiple repetitions of the transport block, and each of the multiple repetition sets is followed by a feedback channel to indicate whether the transport block is successfully decoded by the eNB. FIG. 3 schematically illustrates an exemplary HARQ process according to an embodiment of the present disclosure. In the exemplary HARQ process, the eNB transmits a control channel (e.g., PDCCH) to the UE to schedule the uplink transmission, and then the UE transmits repetitions of a transport block to the eNB in an uplink channel (e.g., PUSCH). As can be seen from FIG. 3, repetitions of the transport block are divided into three repetition sets each of which can include for example 10 repetitions. The repetition number in each repetition set can be indicated in the control channel. After each repetition set is transmitted, a feedback channel (e.g., PHICH) is transmitted from the eNB to the UE to indicate whether the UE has successfully decoded the transport block. The eNB decodes the transport block by combining all received repetition sets of the transport block in the current HARQ process after receiving each of the multiple repetition sets and indicates to the UE whether the transport block is successfully decoded by the eNB in a feedback channel. If the feedback channel indicates that the transport block is not successfully decoded by the eNB, the UE continues to transmit another repetition set of the transport block. For example, the feedback channel can be a one-bit PHICH which uses "ACK" (e.g., "1") to indicate successful decoding and uses "NACK" (e.g., "0") to indicate unsuccessful decoding. In the example of FIG. 3, after receiving the first repetition set, the eNB decodes the transport block using the first repetition set, which is not successful, and thus the eNB indicates unsuccessful decoding. Then, the UE transmits the second repetition set. After receiving the second repetition set, the eNB decodes the transport block by combining the first repetition set and the second repetition set, which is not successful either, and thus the eNB also indicates unsuccessful decoding. Then, the UE transmits the third repetition set. After receiving the third repetition set, the eNB successfully decodes the transport block by combining the first repetition set, the second repetition set and the third repetition set, and indicates successful decoding to the UE. The indication of successful decoding finishes the transmission of this data packet. The UE may then transmit another data packet or monitors the next control channel.

It is noted that 3 repetition sets and 10 repetitions in each repetition set are illustrated in the above example, but the present disclosure is not limited to that. The number of repetitions in each repetition set can be determined according to application scenarios. For example, larger repetition number in each repetition set can be configured for worse channel conditions. Preferably, the repetition number in each repetition set can be indicated in a control channel related to transmission of the transport block. As for the number of repetition sets in one HARQ process, it depends on when the transport block is successfully decoded by the eNB. However, the maximum repetition number for one transport block in one HARQ process can also be applied; for example, the maximum repetition number of one transport block can be indicated by a control channel related to the transmission of the transport block. The indication form of the maximum repetition number can be the maximum repetition times or the maximum number of repetition sets in connection with the number of repetitions in each repetition set. In this case, when the maximum number is reached, even though the feedback channel indicates unsuccessful decoding, the transmission of the present transport block will be terminated. The definition of the maximum repetition number can increase robustness of feedback detection.

According to the first embodiment of the present disclosure, the repetition times for an uplink transport block can be adapted according to the transmission condition, which saves the UE's power in addition to the time-frequency resources since the UE does not necessarily always transmit a large number of repetitions to guarantee successful decoding. Taking FIG. 1 as an example, according to the first embodiment of the present disclosure, the UE will not always transmit 50 repetitions, but transmit for example 10 repetitions each time and then receive a feedback. If 25 repetitions are enough for the eNB to decode the transport block, the UE will receive a positive feedback after transmitting the repetitions three times, that is, totally 30 repetitions are transmitted. Therefore, 20 repetitions can be saved compared with the transmission manner in FIG. 2, such that the UE's power can be saved. It is noted that, although a few more control channels may be needed according to the present disclosure, the UE's power can be saved because uplink transmission consumes much more power than downlink reception (for example, referring to 3GPP Rel. 12).

Figure 4:
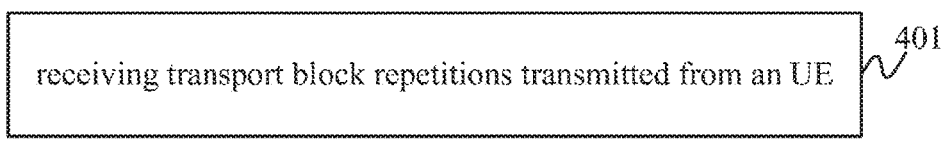
FIG. 4 schematically illustrates a flowchart of a wireless communication method at eNB side according to an embodiment of the present disclosure.

At the eNB side, the first embodiment of the present disclosure provides a wireless communication method 400 performed by an eNB, as shown in FIG. 4 which schematically illustrates the flowchart of the wireless communication method 400 according to the first embodiment of the present disclosure. The wireless communication method 400 includes a step 401 of receiving transport block repetitions transmitted from an UE, wherein one HARQ process includes multiple repetition sets of a transport block if one repetition set of the transport block is not enough for the eNB to successfully decode the transport block, each of the multiple repetition sets includes multiple repetitions of the transport block, and the eNB indicates whether the transport block is successfully decoded by the eNB in a feedback channel by combining all received repetition sets of the transport block in the current HARQ process after receiving each of the multiple repetition sets. If the feedback channel indicates that the transport block is not successfully decoded by the eNB, the UE continues to transmit another repetition set of the transport block for the eNB to receive, and accordingly the eNB can receive said another repetition set of the transport block. It is note that the above descriptions for the method 200 can also be applied to the method 400.

Figure 5:
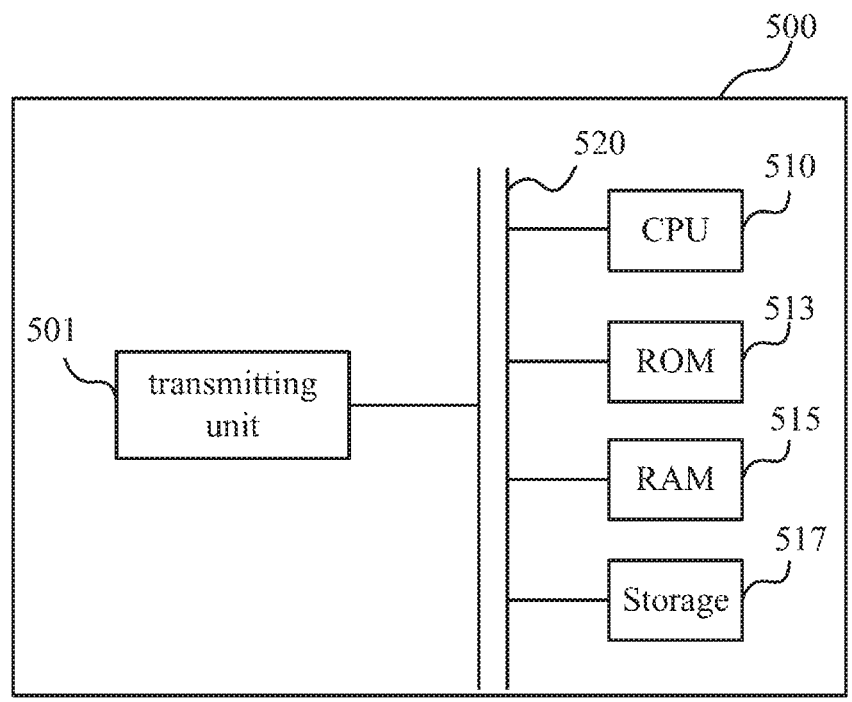
FIG. 5 schematically illustrates a block diagram of a UE for wireless communication according to an embodiment of the present disclosure.

In addition, the first embodiment also provides a UE and an eNB to perform the above described communication methods. FIG. 5 schematically illustrates a block diagram of a UE 500 for wireless communication according to the first embodiment of the present disclosure. The UE 500 can include a transmitting unit 501 configured to transmit transport block repetitions to an eNB, wherein one HARQ process includes multiple repetition sets of a transport block if one repetition set of the transport block is not enough for the eNB to successfully decode the transport block, each of the multiple repetition sets includes multiple repetitions of the transport block, each of the multiple repetition sets is followed by a feedback channel to indicate whether the transport block is successfully decoded by the eNB, and if the feedback channel indicates that the transport block is not successfully decoded by the eNB, the UE continues to transmit another repetition set of the transport block. It is noted that the above descriptions for the method 200 can also be applied to the UE 500.

The UE 500 according to the present disclosure may optionally include a CPU (Central Processing Unit) 510 for executing related programs to process various data and control operations of respective units in the UE 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above transmitting unit 501, CPU 510, ROM 513, RAM 515 and/or storage unit 517 etc. may be interconnected via data and/or command bus 520 and transfer signals between one another.

Respective units as described above do not limit the scope of the present disclosure. According to one implementation of the disclosure, the functions of the above transmitting unit 501 may be implemented by hardware, and the above CPU 510, ROM 513, RAM 515 and/or storage unit 517 may not be necessary. Alternatively, the functions of the above transmitting unit 501 may also be implemented by functional software in combination with the above CPU 510, ROM 513, RAM 515 and/or storage unit 517 etc.

Figure 6:
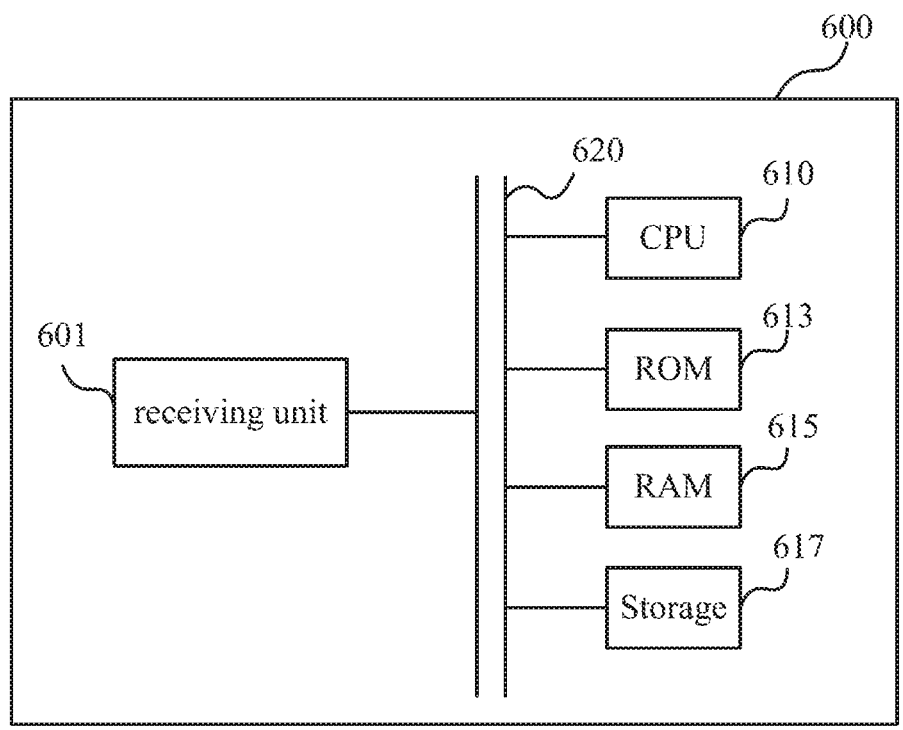
FIG. 6 schematically illustrates a block diagram of an eNB for wireless communication according to an embodiment of the present disclosure.

FIG. 6 schematically illustrates a block diagram of an eNB 600 for wireless communication according to the first embodiment of the present disclosure. The eNB 600 can include a receiving unit configured to receive transport block repetitions transmitted from an UE, wherein one HARQ process includes multiple repetition sets of a transport block if one repetition set of the transport block is not enough for the eNB to successfully decode the transport block, each of the multiple repetition sets includes multiple repetitions of the transport block, the eNB indicates whether the transport block is successfully decoded by the eNB in a feedback channel by combining all received repetition sets of the transport block in the current HARQ process after receiving each of the multiple repetition sets, and if the feedback channel indicates that the transport block is not successfully decoded by the eNB, the UE continues to transmit another repetition set of the transport block for the eNB to receive. It is noted that the above descriptions for the method 400 can also be applied to the eNB 600.

The eNB 600 according to the present disclosure may optionally include a CPU (Central Processing Unit) 610 for executing related programs to process various data and control operations of respective units in the eNB 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above receiving unit 601, CPU 610, ROM 613, RAM 615 and/or storage unit 617 etc. may be interconnected via data and/or command bus 620 and transfer signals between one another.

Respective units as described above do not limit the scope of the present disclosure. According to one implementation of the disclosure, the functions of the above receiving unit 601 may be implemented by hardware, and the above CPU 610, ROM 613, RAM 615 and/or storage unit 617 may not be necessary. Alternatively, the functions of the above receiving unit 601 may also be implemented by functional software in combination with the above CPU 610, ROM 613, RAM 615 and/or storage unit 617 etc.

Figure 7:
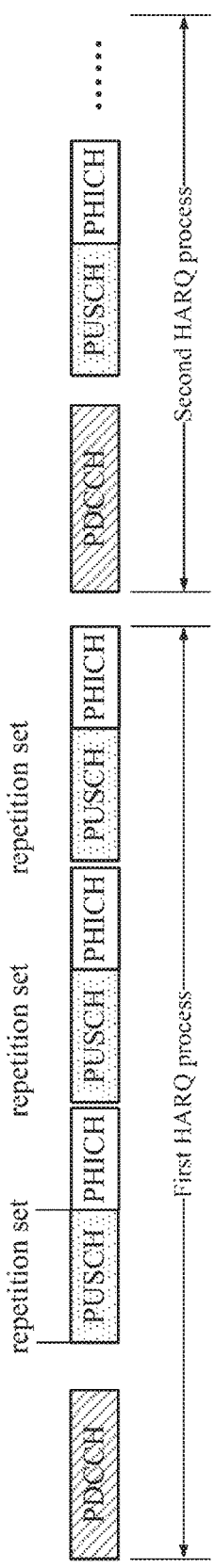
FIG. 7 schematically illustrates an example of two adjacent exemplary HARQ processes according to an embodiment of the present disclosure.

In a first example of the first embodiment of the present disclosure, if the feedback channel indicates that the transport block is successfully decoded by the eNB, the UE monitors the next control channel before transmitting repetitions of another transport block, in other words, when one transport block is successfully transmitted, the communication proceeds to transmit another transport in another HARQ process starting with a control channel (e.g. PDCCH). FIG. 7 schematically illustrates two adjacent exemplary HARQ processes according to the first example of the first embodiment of the present disclosure. After the third feedback channel (e.g. PHICH) of the first HARQ process indicates successful decoding, the first HARQ process is finished, and the UE monitors the next control channel to start the second HARQ process. After receiving the control channel in the second HARQ process, the UE can transmit repetitions of another transport block based on the scheduling of the control channel in the second HARQ process. In other words, each HARQ process is linked with a control channel for flexible scheduling while the UE's power can be saved by early stopping of repetitions in the first example.

Figure 8:
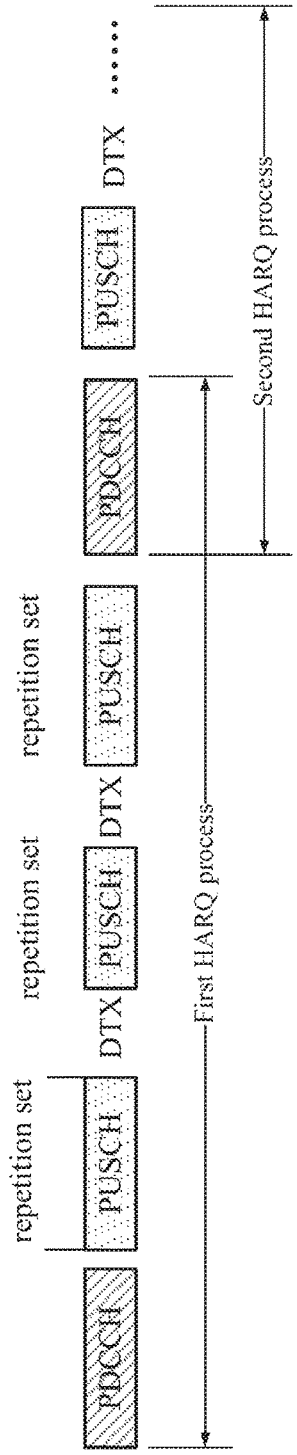
FIG. 8 schematically illustrates another example of two adjacent exemplary HARQ processes according to an embodiment of the present disclosure.

In a second example of the first embodiment, the feedback channel for indicating successful decoding is different from the feedback channel for indicating unsuccessful decoding. In particular, DTX (Discontinuous Transmission) is used to indicate unsuccessful decoding (negative feedback), in other words, the feedback channel does not transmit any signal when the feedback channel indicates that the transport block is not successfully decoded by the eNB. For positive feedback, i.e., when the feedback channel indicates that the transport block is successfully decoded by the eNB, the function of the feedback channel can be realized by a control channel of the next HARQ process. The reception of the control channel of the next HARQ process by the UE implies that the transport block is successfully decoded by the eNB. In other words, when the UE receives a control channel after transmitting a repetition set of the transport block, it implies that the transmission of the transport block is successful, and the current HARQ process is finished. The UE can transmit repetitions of another transport block according to the scheduling of the control channel just received. FIG. 8 schematically illustrates two adjacent exemplary HARQ processes according to the second example of the first embodiment of the present disclosure. As shown in FIG. 8, in the first HARQ process, DTX follows both the first repetition set and the second repetition set to indicate unsuccessful decoding, and the third repetition set is transmitted by the UE. After transmitting the third repetition set, the UE receives a control channel, which implies that the current transport block has been successfully decoded by the eNB, and the first HARQ process is finished. The received control channel can schedule the next uplink transmission of the UE. In this example, the control channel other than the initial control channel has two functions. First, it can imply the transmission of the last transport block is successful. Second, it can schedule the next transmission. According to the second example, PHICH power can be saved.

In a third example of the first embodiment, if the feedback channel indicates that the transport block is successfully decoded by the eNB, the UE transmits repetitions of another transport block with the information in the latest control channel. In other words, the feedback channel is used not only to indicate whether the current transport block is successfully decoded but also to schedule transmission of a new transport block. FIG. 9 schematically illustrates two adjacent exemplary HARQ processes according to the third example of the first embodiment of the present disclosure. As shown in FIG. 9, the first HARQ process starts with a control channel (e.g., PDCCH) which indicates initial transmission and possibly indicates the repetition number of each repetition set. Then, the UE transmits for example 10 repetitions of a transport block each time until the control channel (e.g., PHICH) indicates successful decoding (e.g., "ACK"). When the UE receives "ACK" from the control channel, it will transmit another new transport block without monitoring a new control channel, and the UE can transmit the new transport block with the information (for example, repetition number, MCS, resource position, etc.) in the latest control channel. Here, the initial scheduling assignment indicated by the control channel in the first HARQ process can be used for the new transport block transmission. As can be seen from the third example of the first embodiment, the control channels other the initial one can be saved in addition to reducing the UE's power consumption.

According to the above third example of the first embodiment, flexibility may be compromised since some uplink transmissions may be far away from the initial control channel; however, based on the study of the specifications, for MTC, it is feasible to do continuous transmission of uplink traffic without PDCCH scheduling for each packet.

Based on analysis on 3GPP specification 36.888, there are three typical uplink traffics for MTC UEs, which are:
(1) Command-response traffic (triggered reporting) between base station and WAN module; ~20 bytes for command (Downlink) & ~100 bytes for response (uplink);
(2) Exception reported by WAN module; Report (Uplink) could be ~100 bytes with latency of 3-5 seconds from event at the WAN module;
(3) Periodic reports or Keep alive; ~100 bytes (Uplink).

Observing the above traffics, a UE needs to report ~800 bits. But for MTC in coverage enhancement, to realize the largest PSD (Power Spectral Density), generally one PRB which only carries a few bits (e.g., 16 bits or 72 bits) is transmitted in uplink in a subframe. Therefore, to finish one report of 800 bits, the UE needs to transmit many packets. In addition, the MTC UE is rather static so adaptation of transmission (i.e., MCS and resource position) for each packet is not necessary. Based on the above analysis, it is feasible to do continuous transmission of uplink traffic without PDCCH scheduling for each packet. According to the third example of the first embodiment, time-frequency resources can be saved and the UE's power consumption can be reduced.

In a fourth example of the first embodiment, the feedback channel can indicate more than two states. If the feedback channel (e.g., PHICH) indicates that the transport block is not successfully decoded by the eNB (e.g., "NACK"), the UE continues to transmit another repetition set of the transport block; if the feedback channel indicates that the transport block is successfully decoded by the eNB (e.g. "ACK"), the UE directly transmits repetitions of another transport block with the information in the latest control channel; if the feedback channel indicates a different state from indicating that the transport block is successfully or not successfully decoded by the eNB (e.g., "DTX"), the UE monitors the next control channel before the next transmission. FIG. 10 is a schematic diagram for illustrating three states of the feedback channel according to an embodiment of the present disclosure. As shown in FIG. 10, if the control channel indicates "NACK" or "ACK", the UE will not monitor PDCCH and knows the current status is continuous transmission of uplink, that is, the UE transmits another repetition set of the same transport block or transmits repetitions of another transport block. However, if the eNB does not transmit any signal in the control channel (i.e., indicating "DTX"), the UE will monitor the next control channel (e.g., PDCCH). According to this example, UE power consumption can be reduced since the UE does not need to always monitor a control channel.

Figure 11:
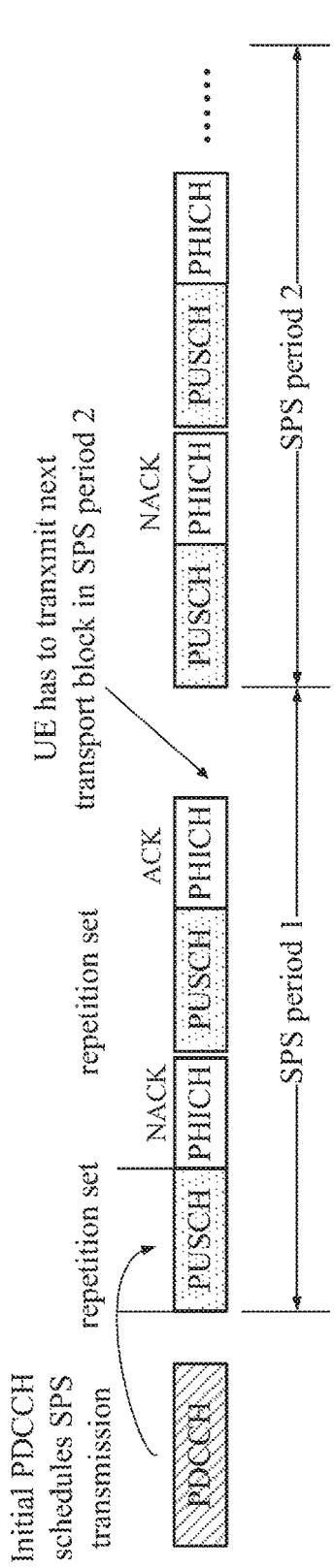
FIG. 11 schematically illustrates a SPS mechanism combined with early stopping according to an embodiment of the present disclosure.

In a fifth example of the first embodiment, an SPS mechanism is combined with early stopping in the first embodiment. Each SPS period may include multiple repetition sets and feedback channels to realize early stopping, but the UE has to wait to the next SPS period to transmit a new packet. In this example, an initial control channel schedules SPS transmission, and if the feedback channel indicates that the transport block is successfully decoded by the eNB, the UE waits to transmit repetitions of another transport block in the next SPS period. FIG. 11 schematically illustrates an SPS mechanism combined with early stopping according to an embodiment of the present disclosure. As shown in FIG. 11, the initial control channel (e.g. PDCCH) can indicate SPS transmission information and possibly the number of repetitions in each repetition set for early stopping. The second feedback channel (e.g., PHICH) indicates successful decoding (e.g., "ACK") such that the transmission of the current transport block is stopped; however, the transmission of a new transport block should wait to the next SPS period (SPS period 2).

In a sixth example of the first embodiment, the feedback channel can also indicate granularity of the repetition set for the next transmission, i.e. how many repetitions in the repetition set. For example, the feedback channel can include 2 bits whose four states can be used to indicate retransmission of the current transport block with repetition granularity 1 (for example, 10 repetitions), retransmission of the current transport block with repetition granularity 2 (for example, 20 repetitions), transmission of a new transport block with repetition granularity 1, and transmission of a new transport block with repetition granularity 2. According to this example, the eNB can realize some flexibility to adjust granularity of the repetition set based on for example the last transmission and can reduce active time. It is noted that how the feedback channel indicates the granularity is not limited herein. For example, the control channel can include two PHICHs, and the UE can interpret PHICH1 and PHICH2 as in the following table.

| PHICH1 | | | |
|---|---|---|---|
| ACK | NACK | DTX | DTX |
| PHICH2 | | | |
| DTX | DTX | ACK | NACK |

| Interpretation | transmission of a new transport block with repetition granularity 1 | retransmission of the current transport block with repetition granularity 1 | transmission of a new transport block with repetition granularity 2 | retransmission of the current transport block with repetition granularity 2 |
|---|---|---|---|---|

Figure 12:
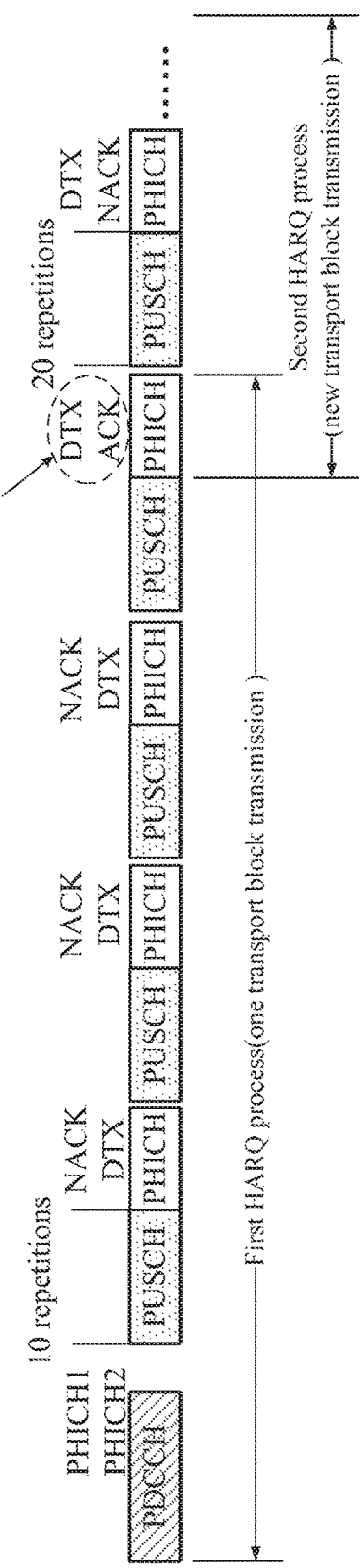
FIG. 12 schematically illustrates an example of adjusting granularity of the repetition set according to an embodiment of the present disclosure.

FIG. 12 schematically illustrates an example of adjusting granularity of the repetition set according to an embodiment of the present disclosure. As shown in FIG. 12, in the first HARQ process, the granularity is 10 repetitions (granularity 1) and is not changed; however, in the second HARQ process the granularity is changed to 20 repetitions (granularity 2) due to the feedback of DTX for PHICH1 and ACK for PHICH2. In this example, the eNB adjusts the granularity based on situation of the last transport block transmission, and thus the eNB can reduce feedbacks.

It is noted that the above examples of the first embodiment can be combined unless the context indicates otherwise.

Second Embodiment

Figure 13:
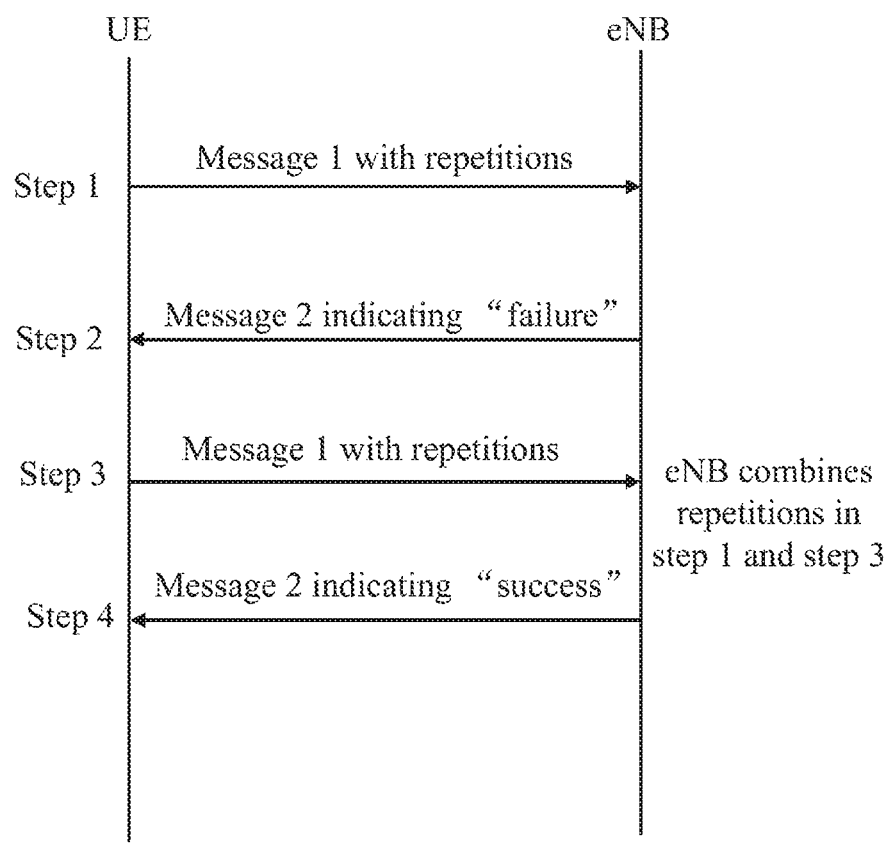
FIG. 13 schematically illustrates an exemplary random access process according to an embodiment of the present disclosure.

The second embodiment of the present disclosure relates to a random access process. FIG. 13 illustrates an exemplary random access process according to the second embodiment of the present disclosure. In step 1, the UE transmits repetitions (for example 10 repetitions) of message 1 (preamble) to an eNB. The eNB receives and decodes the message 1, but it does not decode the message 1 successfully. Therefore, in step 2, the eNB feeds back "failure" in message 2 to the UE. Then, in step 3, the UE transmits repetition of the message 1 again. The eNB receives the repetitions in step 3 and combines repetitions in step 1 and step 3 (for example, totally 20 repetitions). At this point, the eNB successfully decodes the message 1 and thus indicates "success" in step 4. Then, the UE proceeds with the remaining random access procedures (for example, transmit message 3 and wait for message 4). By such a procedure, the UE's repetition times in uplink during random access can be optimized. Obviously, although the message 1 is transmitted twice before successful decoding in the example of FIG. 13, the present disclosure is not limited to this. The end of the transmission depends on the indication of successful decoding, in other words, step 1 and step 3 will be repeated until the eNB indicates "success" to the UE.

Accordingly, the second embodiment of the present disclosure provides a wireless communication method performed by a UE, a wireless communication method performed by an eNB, a UE and an eNB. The wireless communication method performed by a UE can include a transmitting step of transmitting repetitions of a first message to an eNB for random access; and a receiving step of receiving a second message fed back from the eNB for indicating whether the first message is successfully decoded by the eNB, wherein if the second message indicates that the first message is not successfully decoded by the eNB, the transmitting step and the receiving step are repeated until the second message indicates that the first message is successfully decoded by the eNB, and the eNB combines all received repetitions of the first message from the UE to decode the first message.

The wireless communication method performed by an eNB can include a receiving step of receiving repetitions of a first message transmitted by a UE for random access; and a feedback step of feeding back a second message to indicate whether the first message is successfully decoded by the eNB, wherein if the second message indicates that the first message is not successfully decoded by the eNB, the receiving step and the feedback step are repeated until the second message indicates that the first message is successfully decoded by the eNB, and the eNB combines all received repetitions of the first message from the UE to decode the first message.

A UE for wireless communication according to the second embodiment of the present disclosure includes: a transmitting unit configured to transmit repetitions of a first message to an eNB for random access; and a receiving unit configured to receive a second message fed back from the eNB for indicating whether the first message is successfully decoded by the eNB, wherein if the second message indicates that the first message is not successfully decoded by the eNB, the transmitting unit and the receiving unit repeat their operations until the second message indicates that the first message is successfully decoded by the eNB, and the eNB combines all received repetitions of the first message from the UE to decode the first message.

An eNB for wireless communication according to the second embodiment of the present disclosure includes: a receiving unit configured to receive repetitions of a first message transmitted by a UE for random access; and a feedback unit configured to feed back a second message to indicate whether the first message is successfully decoded by the eNB, wherein if the second message indicates that the first message is not successfully decoded by the eNB, the receiving unit and the feedback unit repeat their operations until the second message indicates that the first message is successfully decoded by the eNB, and the eNB combines all received repetitions of the first message from the UE to decode the first message.

It is noted that the UE and the eNB in the second embodiment of the present disclosure can have similar structures in FIG. 5 and FIG. 6, and the descriptions related to FIG. 5 and FIG. 6 are also applied here. In addition, the first embodiment can be combined with the second embodiment, and the detailed descriptions in the first embodiment may be applied to the second embodiment unless the context indicates otherwise. According to the second embodiment of the present disclosure, the UE's repetition times in uplink during random access can be optimized.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A wireless communication method performed by a UE, including:
  transmitting transport block repetitions to an eNB, wherein
  one HARQ process includes multiple repetition sets of a transport block if one repetition set of the transport block is not enough for the eNB to successfully decode the transport block,
  each of the multiple repetition sets includes multiple repetitions of the transport block,
  each of the multiple repetition sets is followed by a feedback channel to indicate whether the transport block is successfully decoded by the eNB, and
  if the feedback channel indicates that the transport block is not successfully decoded by the eNB, the UE continues to transmit another repetition set of the transport block.

(2). The wireless communication method according to (1), wherein
  if the feedback channel indicates that the transport block is successfully decoded by the eNB, the UE transmits repetitions of another transport block with the information in the latest control channel.

(3). The wireless communication method according to (1), wherein
  if the feedback channel indicates that the transport block is successfully decoded by the eNB, the UE monitors next control channel before transmitting repetitions of another transport block.

(4). The wireless communication method according to (1), wherein
  the function of the feedback channel is realized by a control channel of the next HARQ process when the feedback channel indicates that the transport block is successfully decoded by the eNB,
  the reception of the control channel of the next HARQ process by the UE implies that the transport block is successfully decoded by the eNB, and
  the feedback channel does not transmit any signal when the feedback channel indicates that the transport block is not successfully decoded by the eNB.

(5). The wireless communication method according to any of (1)-(3), wherein the feedback channel also indicates granularity of the repetition set for the next transmission.

(6). The wireless communication method according to any of (1)-(5), wherein the maximum repetition number of one transport block is indicated by a control channel.

(7). The wireless communication method according to (1), wherein
  if the feedback channel indicates that the transport block is successfully decoded by the eNB, the UE transmits repetitions of another transport block with the information in the latest control channel, and
  if the feedback channel indicates a different state from indicating that the transport block is successfully or not successfully decoded by the eNB, the UE monitors next control channel.

(8). The wireless communication method according to (1), wherein
  an initial control channel schedules semi-persistent scheduling (SPS) transmission, and
  if the feedback channel indicates that the transport block is successfully decoded by the eNB, the UE waits to transmit repetitions of another transport block in the next SPS period.

(9). A wireless communication method performed by an eNB, including:
  receiving transport block repetitions transmitted from an UE, wherein
  one HARQ process includes multiple repetition sets of a transport block if one repetition set of the transport block is not enough for the eNB to successfully decode the transport block,
  each of the multiple repetition sets includes multiple repetitions of the transport block,
  the eNB indicates whether the transport block is successfully decoded by the eNB in a feedback channel by combining all received repetition sets of the transport block in current HARQ process after receiving each of the multiple repetition sets, and
  if the feedback channel indicates that the transport block is not successfully decoded by the eNB, the UE continues to transmit another repetition set of the transport block for the eNB to receive.

(10). The wireless communication method according to (9), wherein if the feedback channel indicates that the transport block is successfully decoded by the eNB, the UE transmits repetitions of another transport block with the information in the latest control channel.

(11). The wireless communication method according to (9), wherein
  the eNB uses a control channel of the next HARQ process to indicate that the transport block is successfully decoded by the eNB, and
  the feedback channel does not transmit any signal when the feedback channel indicates that the transport block is not successfully decoded by the eNB.

(12). The wireless communication method according to any of (9)-(11), wherein the eNB indicates the maximum repetition number of one transport block in a control channel.

(13). The wireless communication method according to (9), wherein
  if the feedback channel indicates that the transport block is successfully decoded by the eNB, the UE transmits repetitions of another transport block with the information in the latest control channel, and
  if the feedback channel indicates a different state from indicating that the transport block is successfully or not successfully decoded by the eNB, the UE monitors next control channel before next transmission.

(14). The wireless communication method according to (9), wherein
  the eNB schedules SPS transmission in an initial control channel, and
  if the feedback channel indicates that the transport block is successfully decoded by the eNB, the UE waits to transmit repetitions of another transport block in the next SPS period.

(15). A UE for wireless communication, including:
a transmitting unit that transmits transport block repetitions to an eNB, wherein
one HARQ process includes multiple repetition sets of a transport block if one repetition set of the transport block is not enough for the eNB to successfully decode the transport block,
each of the multiple repetition sets includes multiple repetitions of the transport block,
each of the multiple repetition sets is followed by a feedback channel to indicate whether the transport block is successfully decoded by the eNB, and
if the feedback channel indicates that the transport block is not successfully decoded by the eNB, the UE continues to transmit another repetition set of the transport block.

(16). An eNB for wireless communication, including:
a receiving unit that receives transport block repetitions transmitted from an UE, wherein
one HARQ process includes multiple repetition sets of a transport block if one repetition set of the transport block is not enough for the eNB to successfully decode the transport block,
each of the multiple repetition sets includes multiple repetitions of the transport block,
the eNB indicates whether the transport block is successfully decoded by the eNB in a feedback channel by combining all received repetition sets of the transport block in current HARQ process after receiving each of the multiple repetition sets, and
if the feedback channel indicates that the transport block is not successfully decoded by the eNB, the UE continues to transmit another repetition set of the transport block for the eNB to receive.

(17). A wireless communication method performed by a UE, including:
transmitting repetitions of a first message to an eNB for random access; and
receiving a second message fed back from the eNB for indicating whether the first message is successfully decoded by the eNB, wherein
if the second message indicates that the first message is not successfully decoded by the eNB, the transmitting and the receiving are repeated until the second message indicates that the first message is successfully decoded by the eNB, and
the eNB combines all received repetitions of the first message from the UE to decode the first message.

(18). A wireless communication method performed by an eNB, including:
receiving repetitions of a first message transmitted by a UE for random access; and
feeding back a second message to indicate whether the first message is successfully decoded by the eNB, wherein
if the second message indicates that the first message is not successfully decoded by the eNB, the receiving and the feeding back are repeated until the second message indicates that the first message is successfully decoded by the eNB, and
the eNB combines all received repetitions of the first message from the UE to decode the first message.

(19). A UE for wireless communication, including:
a transmitting unit that transmits repetitions of a first message to an eNB for random access; and
a receiving unit that receives a second message fed back from the eNB for indicating whether the first message is successfully decoded by the eNB, wherein
if the second message indicates that the first message is not successfully decoded by the eNB, the transmitting unit and the receiving unit repeat their operations until the second message indicates that the first message is successfully decoded by the eNB, and
the eNB combines all received repetitions of the first message from the UE to decode the first message.

(20). An eNB for wireless communication, including:
a receiving unit that receives repetitions of a first message transmitted by a UE for random access; and
a feedback unit that feeds back a second message to indicate whether the first message is successfully decoded by the eNB, wherein
if the second message indicates that the first message is not successfully decoded by the eNB, the receiving unit and the feedback unit repeat their operations until the second message indicates that the first message is successfully decoded by the eNB, and
the eNB combines all received repetitions of the first message from the UE to decode the first message.

It is noted that the technical features in the above methods can also be incorporated in the above UEs and/or eNBs. In addition, embodiments of the present disclosure can also provide an integrated circuit which includes module(s) for performing the step(s) in the above respective communication methods. Further, embodiments of the present can also provide a computer readable storage medium having stored thereon a computer program containing a program code which, when executed on a computing device, performs the step(s) of the above respective communication methods.

What is claimed is:

1. A wireless communication method performed by a user equipment (UE), comprising:
transmitting a set of repetitions of a transport block to an eNodeB (eNB);
receiving, from the eNB, a feedback channel,
wherein, in response to the feedback channel indicating that the set of repetitions of the transport block is not successfully decoded by the eNB, transmitting another set of repetitions of the transport block; and
in response to the feedback channel indicating that the set of the repetitions of the transport block is successfully decoded by the eNB, receiving control information relating to repetitions of another transmission before transmitting repetitions of another transport block and transmitting the another transport block.

2. The wireless communication method according to claim 1, wherein
the control information relating to repetitions of another transmission are received with the feedback channel.

3. The wireless communication method according to claim 1, wherein
the feedback channel indicates a transmission of the other transport block in response to the transport block being successfully decoded by the eNB.

4. The wireless communication method according to claim 1, wherein the feedback channel indicates granularity of the another set of repetitions of the transport block.

5. The wireless communication method according to claim 1, wherein the feedback channel indicates a maximum repetition number within the set of repetitions of the transport block.

6. The wireless communication method according to claim 1, wherein a granularity of the set of the repetitions of the transport block is different from a granularity of the another set of the repetitions of the transport block.

7. The wireless communication method according to claim 1, wherein the set of the repetitions of the transport block is transmitted in first consecutive resources and the another set of the repetitions of the transport block is transmitted in second consecutive resources.

8. A wireless communication apparatus comprising:
a transmitter, which in operation, transmits a set of repetitions of a transport block to an eNodeB (eNB); and
a receiver, which in operation, receives, from the eNB, a feedback channel,
wherein, in response to the feedback channel indicating that the set of repetitions of the transport block is not successfully decoded by the eNB, the transmitter transmits another set of repetitions of the transport block, and
in response to the feedback channel indicating that the set of repetitions of the transport block is successfully decoded by the eNB, the receiver receives control information relating to repetitions of another transmission before transmitting the repetitions of another transport block and the transmitter transmits the another transport block.

9. The wireless communication apparatus according to claim 8, wherein in response to the feedback channel indicating that the set of repetitions of the transport block is successfully decoded by the eNB, the transmitter transmits repetitions of the another transport block based on latest control information.

10. The wireless communication apparatus according to claim 8, wherein the control information relating to repetitions of another transmission are received with the feedback channel.

11. The wireless communication apparatus according to claim 8, wherein the feedback channel indicates a transmission of the another transport block in response to the transport block being successfully decoded by the eNB.

12. The wireless communication apparatus according to claim 8, wherein the feedback channel indicates granularity of the another set of repetition of the transport block.

13. The wireless communication apparatus according to claim 8, wherein the feedback channel indicates a maximum repetition number within the set of repetitions of the transport block.

14. The wireless communication apparatus according to claim 8, wherein a granularity of the set of repetitions of the transport block is different from a granularity of the another set of the repetitions of the transport block.

15. The wireless communication apparatus according to claim 8, wherein the set of repetitions of the transport block is transmitted in first consecutive resources and the another set of repetitions of the transport block is transmitted in second consecutive resources.

* * * * *